(12) United States Patent
Orban et al.

(10) Patent No.: US 10,159,378 B1
(45) Date of Patent: Dec. 25, 2018

(54) HANGING APPARATUS FOR COOKWARE OR BAKEWARE CLOSURES OR LIDS AND RELATED METHODS

(71) Applicants: Christopher Orban, Poway, CA (US); Melissa Orban, Poway, CA (US)

(72) Inventors: Christopher Orban, Poway, CA (US); Melissa Orban, Poway, CA (US)

(*) Notice: Subject to any disclaimer, the term of this patent is extended or adjusted under 35 U.S.C. 154(b) by 0 days.

(21) Appl. No.: 15/701,354

(22) Filed: Sep. 11, 2017

(51) Int. Cl.
| | |
|---|---|
| *A47J 36/12* | (2006.01) |
| *F16M 13/00* | (2006.01) |
| *F16M 13/02* | (2006.01) |
| *F16B 19/00* | (2006.01) |
| *F16B 43/00* | (2006.01) |
| *F16B 45/00* | (2006.01) |

(52) U.S. Cl.
CPC ............ *A47J 36/12* (2013.01); *F16B 19/008* (2013.01); *F16B 43/001* (2013.01); *F16B 45/00* (2013.01); *F16M 13/005* (2013.01); *F16M 13/02* (2013.01)

(58) Field of Classification Search
CPC ........ A47J 36/12; A47J 36/128; A47J 36/101; A47J 36/06; A47J 27/08; F16B 19/008; F16B 43/001; F16B 45/00; F16B 13/005; F16B 13/02
USPC ... 248/205.1, 176.2, 309.1, 322, 213.2, 303, 248/339, 682, 218.4, 227.2; 211/70.7, 211/41.2, 41.1, 41.11, 41.4, 181.1; 220/774, 694, 735, 729, 573.1, 912, 379, 220/763, 756
See application file for complete search history.

(56) References Cited

U.S. PATENT DOCUMENTS

| | | | | |
|---|---|---|---|---|
| 3,282,437 | A  * | 11/1966 | Hansen ................ | A47F 7/0064 211/41.7 |
| 9,351,606 | B2 * | 5/2016 | Gaynor .................. | A47J 36/10 |
| 9,668,617 | B1 * | 6/2017 | Barnes .................. | A47J 43/287 |
| 2010/0193523 | A1 * | 8/2010 | Beisheim ............... | A47J 36/12 220/379 |
| 2011/0095031 | A1 * | 4/2011 | Welk ...................... | A47J 36/12 220/573.1 |
| 2012/0235003 | A1 * | 9/2012 | Turbes ................... | A47J 36/12 248/309.1 |
| 2015/0272384 | A1 * | 10/2015 | Ferron ................... | A47J 36/06 220/201 |
| 2016/0169267 | A1 * | 6/2016 | Pool ....................... | F16L 345/00 248/547 |

* cited by examiner

*Primary Examiner* — Nkeisha Smith
(74) *Attorney, Agent, or Firm* — Buche & Associates, P.C.; John K. Buche; Bryce A. Johnson

(57) ABSTRACT

Disclosed is a space saving, heat-damage reducing, mess-avoiding hanging apparatus for cookware or bakeware closures and related methods. In use, the apparatus may be (a) contained within cookware/bakeware while the closure or lid is closing the cookware/bakeware or (b) used to hang the closure or lid on to the bakeware/cookware in a handle-out orientation via laying the hook of the apparatus over a lip or edge of the cookware or bakeware.

19 Claims, 4 Drawing Sheets

HANGING APPARATUS FOR COOKWARE OR BAKEWARE CLOSURES OR LIDS AND RELATED METHODS

CROSS-REFERENCE TO RELATED APPLICATIONS

Not applicable.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

REFERENCE TO AN APPENDIX SUBMITTED ON A COMPACT DISC AND INCORPORATED BY REFERENCE OF THE MATERIAL ON THE COMPACT DISC

Not applicable.

STATEMENT REGARDING PRIOR DISCLOSURES BY THE INVENTOR OR A JOINT INVENTOR

Reserved for a later date, if necessary.

BACKGROUND OF THE INVENTION

Field of Invention

The disclosed subject matter is generally in the field of food preparation and culinary art. Specifically, the disclosed subject matter is in the field of devices for hanging lids or other closers of cookware or bakeware to a lip or edge.

Background of the Invention

Cookware and bakeware are food preparation containers that are respectively used on a kitchen stove or counter top (e.g. pots, pans, crockpots, etc.) or in an oven (e.g., Dutch oven). Sometimes, cookware and bakeware feature lids or other closers for the container. Lids and closures must be removed and set aside before the contents of the bakeware/cookware can be accessed (during food preparation or food service).

Modern kitchens have transformed from a purely functional area of olden days to open spaces located at the heart of each home. With kitchens more commonly becoming the center of a family home, counter space is often limited. This becomes especially true when preparing meals. Lack of space has made setting aside of bakeware/cookware closures inconvenient or impractical. Potlucks or other food themed gatherings often have countertops that are completely covered with bakeware/cookware so that no counter space is available for setting aside the closures or lids of the bakeware/cookware during food service. Additionally, even if counter space is available, setting aside a cookware/bakeware closure can still be impractical or inconvenient because the cookware/bakeware closures can be (a) too hot and cause heat damage where set aside or (b) soiled with food and cause a mess where set aside. So, a need exists for devices for other mechanisms for setting aside bakeware/cookware closures or lids in a space saving manner while reducing the chance of damage or mess where set aside.

SUMMARY OF THE INVENTION

In view of the foregoing, an object of this specification is to disclose a space saving, heat-damage reducing, mess-avoiding hanging apparatus for cookware or bakeware closures and related methods. In a preferred embodiment, the disclosed apparatus is defined by a bolt washer-type body, a hook or lever, and a friction surface. Suitably, the washer-type body may be attached to an inside surface of a bakeware/cookware closure or lid. In the preferred case, the closure or lid may be defined by a handle or other gripping mechanism on an outside surface that is attached by a bolt passing through the closure or lid from the opposite side (i.e., inside of the closure). Preferably, the bolt may be removed, the disclosed apparatus positioned on the inside of the closure or lid, the bolt passed through the bolt washer-type body and the closure or lid, so that the disclosed apparatus may be secured to the inside surface of the closure or lid opposite to the handle secured to the outside of the closure or lid. In use, the apparatus may be (a) contained within cookware/bakeware while the closure or lid is closing the cookware/bakeware or (b) used to hang the closure or lid on to the bakeware/cookware in a handle-out orientation via laying the hook of the apparatus over a lip or edge of the cookware or bakeware.

BRIEF DESCRIPTION OF THE SEVERAL VIEWS OF THE DRAWINGS

Other objectives of the disclosure will become apparent to those skilled in the art once the invention has been shown and described. The manner in which these objectives and other desirable characteristics can be obtained is explained in the following description and attached figures in which.

Figure 1:
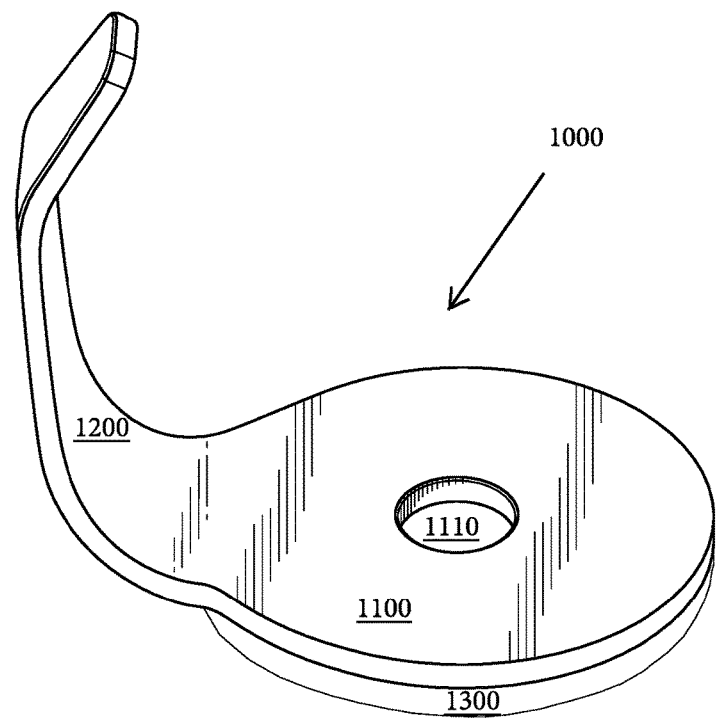
FIG. 1 is a perspective view of the disclosed hanging apparatus 1000 for cookware or bakeware closures.
Figure 2:
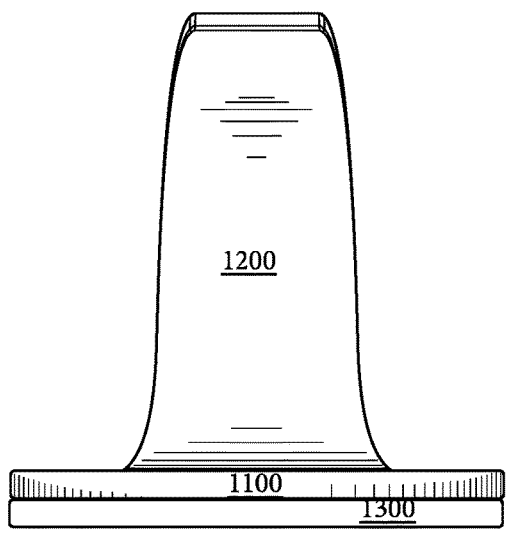
FIG. 2 is a front view of the apparatus 1000 of FIG. 1.
Figure 3:
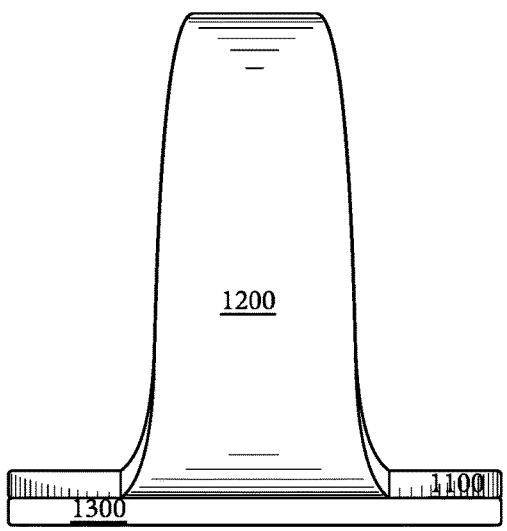
FIG. 3 is a rear view of the apparatus 1000 of FIG. 1.
Figure 4:
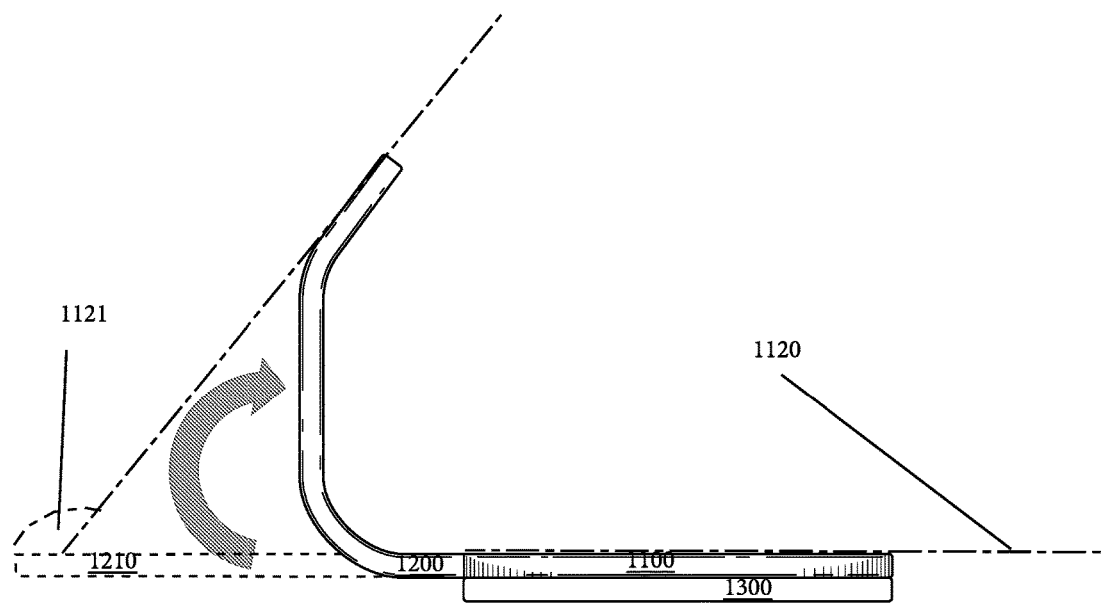
FIG. 4 is a top view of the apparatus 1000 of FIG. 1.
Figure 5:
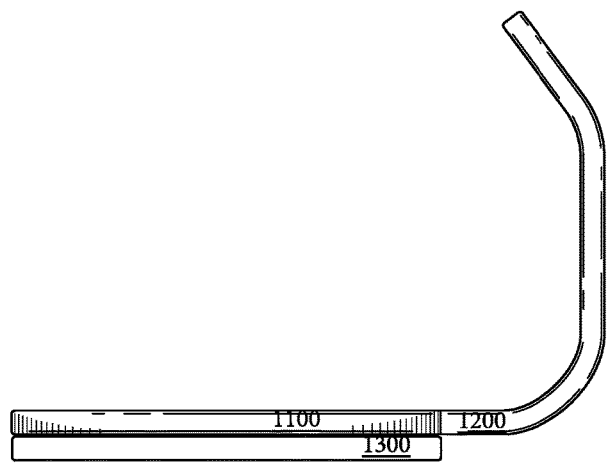
FIG. 5 is a bottom view of the apparatus 1000 of FIG. 1.
Figure 6:
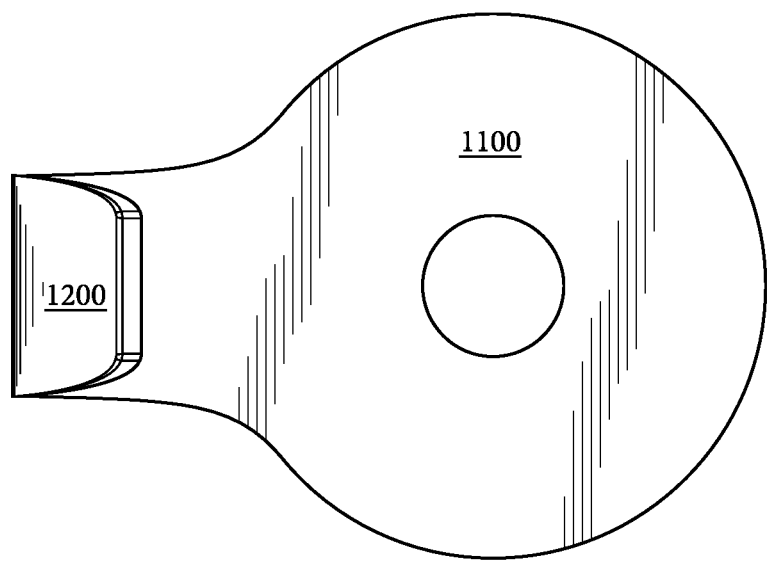
FIG. 6 is a left side view of the apparatus 1000 of FIG. 1.
Figure 7:
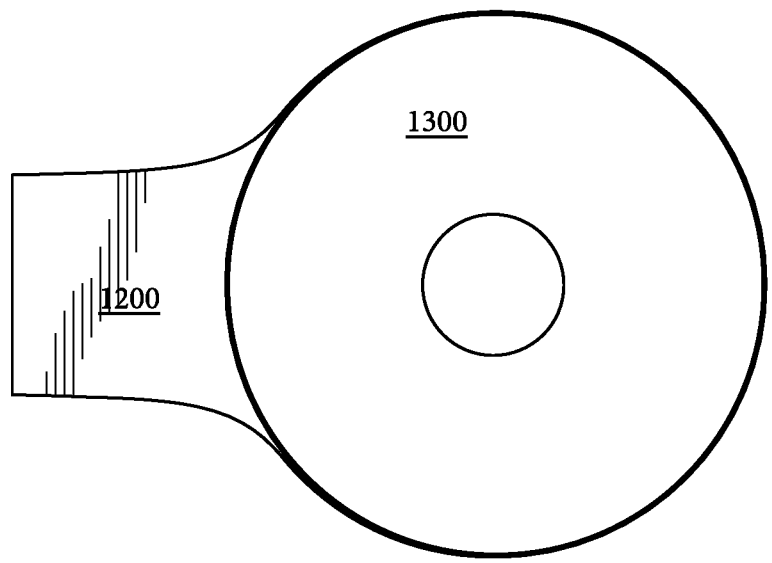
FIG. 7 is a right side view of the apparatus 1000 of FIG. 1.

In the figures, the following components correspond to the associated reference numerals:

Hanging apparatus—1000;
  Bolt washer-type body—1100;
  Bolt aperture—1110;
  Plane—1120
    Angle—1121
  Hook or Lever—1200;
    Coplanar extension—1210
  Friction surface—1300;
Closure or Lid—2000;
  Outside surface—2100
  Inside surface—2200
    Rim—2210
    Bolt hole—2220
  Handle—2300;
  Bolt—2310;

Cookware/bakeware container—3000;
Lip or edge—3100.

It is to be noted, however, that the appended figures illustrate only typical embodiments of this invention and are therefore not to be considered limiting of its scope, for the invention may admit to other equally effective embodiments that will be appreciated by those reasonably skilled in the relevant arts. Also, figures are not necessarily made to scale but are representative.

DETAILED DESCRIPTION OF PREFERRED EMBODIMENTS

Disclosed is a space saving, heat-damage reducing, mess-avoiding hanging apparatus for cookware or bakeware closures and related methods. In use, the apparatus may be (a) contained within cookware/bakeware while the closure or lid is closing the cookware/bakeware or (b) used to hang the closure or lid on to the bakeware/cookware in a handle-out orientation via laying the hook of the apparatus over a lip or edge of the cookware or bakeware. The more specific details of the disclosed apparatus are described with reference to the attached figures.

Figure 8:
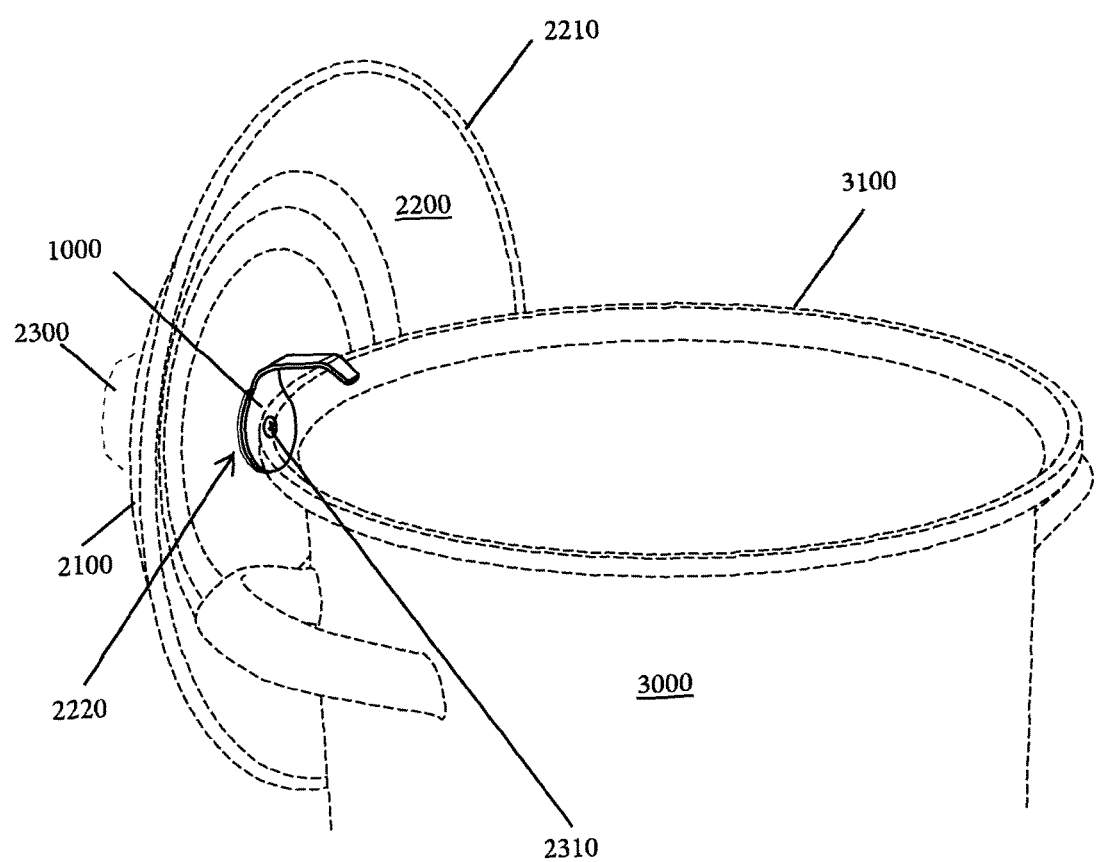
FIG. 8 is an environmental view of the apparatus 1000 of FIG. 1 installed on an exemplary closure or lid 2000 of typical cookware/bakeware containers 3000.

FIG. 1 is a perspective view of the disclosed hanging apparatus 1000 for cookware or bakeware closures 3000 (not shown in FIG. 1, see FIG. 8). FIGS. 2 through 7 are the orthogonal view of the apparatus 1000 shown in FIG. 1. As depicted in FIGS. 2 through 7, the device is the disclosed apparatus 1000 may be defined by a bolt washer-type body 1100, a hook or lever 1200, and a friction surface 1300.

FIGS. 1 through 7 depict the various component parts of the apparatus 1000. First, the bolt washer-type body 1100 is suitably defined by a circular disk with a bolt aperture 1110 provided therethrough. Although shown as a circular disk, it should be noted that the washer-type body 1100 need not be of circular footprint and can instead have a footprint of any geometric shape. Also, it is contemplated that the washer type body 1100 need not be of the plain or flat washer type but can be of any washer type (e.g., fender washer, penny washer, spherical washer, anchor plate washer, torque washer, cupped spring washer, curved disk spring washer, wave washer, split washer, toothed lock washer or tab washer.

Second, the hook or lever 1200 may suitably be defined by a curved or bent radial projection from the bolt washer type body 1100. In a preferred embodiment, the body 1100 and hook 1200 may be constructed as a single unit. Specifically, the body 1100 may be stamped or molded from metal with a coplanar extension 1210 (e.g., in the manner of a tab washer) whereafter the extension may be bent (e.g., in the direction of the arrow of FIG. 4) out of plane 1120 with the body 11000 into the hook or lever 1200. Suitably, the angle 1121 between the plane 1120 and hook's edge is one hundred and twenty (120) degrees or just above one hundred and twenty degrees. In a preferred embodiment, the angle helps create a solid graps of the container 3000 (not shown). Suitably, there could be two bends with the bend adjacent to the body 1100 being ninety degrees off plane and the second bend about three fourths inch (¾") down the extension at thirty degrees relative to the bent extension. Alternatively, the body 1100 may be stamped or molded out of high-temperature tolerant and rigid plastics. Materials that are suitable for construction of the hook 1200 and body 1100 include, but should not be limited to: carbon steel, spring still, stainless steel (e.g., 304 and 316/316A), copper, brass, aluminum, titanium, iron, bronze, zinc, silcon bronze, Inconel, monel, hastelloy, thermoplastics and thermosetting polymers like polyethelene, PTFE (Teflon), nylon (e.g., 6 and 66), nylatron, tecamid MDS, fibers, ceramics and the like. Suitably, the materials used should be "food grade."

Finally, the friction surface 1300 may be defined by a fabric or rubber layer positioned on one side of the body 1100. Suitably, the friction surface may operate to retain the hook 1200 in a specified orientation relative to a lid 2000 (not shown) and as a gasket to seal the connection between the apparatus 1000 and lid 2000 (not shown). The friction surface 1300 can act as a heat insulator or shock absorber. Although the friction surface is preferred, it is considered an optional feature of the disclosed apparatus 1000 because the apparatus 1000 could function according to the spirit and intent of the disclosure without the friction surface 1300.

FIG. 8 is an environmental view of the apparatus 1000 of FIGS. 1 through 7 installed on an exemplary closure or lid 2000 of typically cookware/bakeware containers 3000. Suitably, the washer-type body 1100 may be attached to an inside surface 2200 of a bakeware/cookware 3000 closure or lid 2000. In the preferred case, the closure or lid 2000 may be defined by a handle 2300 or other gripping mechanism on an outside surface 2100 that is attached by a bolt 2310 passing through a bolt hole 2220 the closure or lid 2000 from the opposite side (i.e., inside surface 2200 of the closure). Preferably, the bolt 2310 may be removed, the disclosed apparatus 1000 positioned on the inside 2200 of the closure or lid 2000, the bolt 2310 passed through the bolt washer-type body 1100 via the aperture 1110 and the hole 2220 of the closure or lid 2000. Oftentimes, a lid 2000 will feature a washer that holds that is part of the bolt 2310 and handle 2300 assembly wherein this disclosure contemplates replacing the washer with the apparatus 1000. The result may be that the disclosed apparatus 1000 is secured to the inside surface 2200 of the closure or lid 200 opposite to the handle 2310 secured to the outside 2100 of the closure or lid 2000. In use, the apparatus 1000 may be (a) contained within cookware/bakeware while the closure or lid 2000 is closing the cookware/bakeware 3000 via interaction with the rim 2210 and lip or edge 3100 of the cookware/bakeware container or (b) used to hang the closure or lid 2000 on to the bakeware/cookware 3000 in a handle-out orientation via laying the hook 1200 of the apparatus over a lip or edge 3100 of the cookware or bakeware 3000.

Although the method and apparatus is described above in terms of various exemplary embodiments and implementations, it should be understood that the various features, aspects and functionality described in one or more of the individual embodiments are not limited in their applicability to the particular embodiment with which they are described, but instead might be applied, alone or in various combinations, to one or more of the other embodiments of the disclosed method and apparatus, whether or not such embodiments are described and whether or not such features are presented as being a part of a described embodiment. Thus the breadth and scope of the claimed invention should not be limited by any of the above-described embodiments.

Terms and phrases used in this document, and variations thereof, unless otherwise expressly stated, should be construed as open-ended as opposed to limiting. As examples of the foregoing: the term "including" should be read as meaning "including, without limitation" or the like, the term "example" is used to provide exemplary instances of the item in discussion, not an exhaustive or limiting list thereof, the terms "a" or should be read as meaning "at least one," "one or more," or the like, and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that might be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases might be absent. The use of the term "assembly" does not imply that the components or functionality described or claimed as part of the module are all configured in a common package. Indeed, any or all of the various components of a module, whether control logic or other components, might be combined in a single package or separately maintained and might further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives might be implemented without confinement to the illustrated examples. For example, block diagrams and their accompanying description should not be construed as mandating a particular architecture or configuration.

All original claims submitted with this specification are incorporated by reference in their entirety as if fully set forth herein.

We claim:

1. A hanging apparatus that supports a lid of a container on the container in a handle-out orientation, said hanging apparatus comprising:
   a bolt washer-type body defined with a bolt aperture provided therethrough,
   a hook or lever defined by a curved or bent projection from the bolt washer-type body;
   wherein the bolt washer-type body is secured to an inside surface of the lid of the container in a position that is opposite to a handle of the lid of the container via passing a bolt (a) through the aperture of the bolt washer type body, (b) through a bolt hole in the lid and (c) into to the handle; and,
   wherein the hook or lever is positioned on a lip or edge of the container.

2. The hanging apparatus of claim 1 further comprising a friction surface defined by a layer of fabric or rubber positioned between the bolt washer-type body and the inside surface of the lid of the container.

3. The hanging apparatus of claim 1 further comprising a gasket between the bolt washer-type body and the inside surface of the lid of the container.

4. The hanging apparatus of claim 3 where the container is a crock pot.

5. The hanging apparatus of claim 1 where the bolt washer-type body is defined by a disk with the bolt aperture provided therethrough the disk.

6. The handing apparatus of claim 5 where the disk is a circular disk and features a circular footprint.

7. The hanging apparatus of claim 5 wherein the hook or lever is defined by a curved or bent radial projection from the bolt washer type body.

8. The hanging apparatus of claim 7 wherein the bolt washer type body and hook or lever are constructed as a single unit.

9. The hanging apparatus of claim 8 wherein the bolt washer type body is stamped or molded from metal with a coplanar extension relative to a plane of the disk and whereafter the extension is bent out of plane with the disk to form the hook or lever.

10. The hanging apparatus of claim 9 wherein bending the extension relative to the plane of the disk results in an angle between the plane of the disk and an edge of the extension of one hundred and twenty degrees.

11. The hanging apparatus of claim 7 wherein the bolt washer type body and hook or lever are constructed as a single unit and wherein the bolt washer type body is stamped or molded from metal with a coplanar extension relative to a plane of the disk and whereafter the extension is bent out of plane with the disk to form the hook or lever.

12. The hanging apparatus of claim 5 wherein the hook or lever is be defined by a curved or bent radial projection from the bolt washer type body.

13. A method of constructing a hanging apparatus that supports a lid of a container on the container in a handle-out orientation, said method comprising the steps of:
   ensuring that the hanging apparatus is defined by a bolt washer-type body and a hook or lever wherein the bolt washer-type body is defined by a disk with a bolt aperture provided therethrough the disk and wherein the hook or lever is defined by a curved or bent projection from the bolt washer-type body;
   securing the bolt washer-type body to an inside surface of the lid of the container in a position that is opposite to a handle of the lid of the container via passing a bolt (a) through the aperture of the bolt washer type body, (b) through a bolt hole in the lid and (c) into to the handle; and,
   positioning the hook or lever on a lip or edge of the container.

14. The method of claim 13 wherein the hanging apparatus further comprises a friction surface defined by a layer of fabric or rubber between the bolt washer-type body and the inside surface of the lid of the container.

15. The method of claim 14 further comprising the step of holding the hook or lever in place by pressing the friction surface against the inside surface of the lid of the container.

16. The method of claim 13 wherein the hanging apparatus comprises a gasket between the bolt washer-type body and the inside surface of the lid of the container.

17. The method of claim 16 wherein the hanging apparatus where the container is a crock pot.

18. A method of retrofitting a lid a container with a hanging apparatus that supports the lid on the container in a handle-out orientation, said method comprising the steps of:
   ensuring that the hanging apparatus is defined by a bolt washer-type body and a hook or lever wherein the bolt washer-type body is defined by a disk with a bolt aperture provided therethrough the disk and wherein the hook or lever is defined by a curved or bent projection from the bolt washer-type body;
   removing a bolt that secures the handle to the lid;
   securing the bolt washer-type body to an inside surface of the lid of the container in a position that is opposite to a handle of the lid of the container via passing the bolt (a) through the aperture of the bolt washer type body, (b) through a bolt hole in the lid and (c) into to the handle; and positioning the hook or lever on a lip or edge of the container.

19. The method of claim 18 where the disk is a circular disk and features a circular footprint.

* * * * *